United States Patent

Doutt et al.

[15] 3,656,801
[45] Apr. 18, 1972

[54] QUICKLY DETACHABLE HINGE FOR TRUCK BODY TAILGATE

[72] Inventors: Oliver Doutt, Route 7, P.O. Box 801, Lynwood, Wash. 98310; Thomas D. Doutt, 1981-28th West, Lynwood, Wash. 98036

[22] Filed: May 14, 1970

[21] Appl. No.: 37,106

[52] U.S. Cl. ................................296/57 R, 16/171, 49/389, 49/465, 287/126
[51] Int. Cl. .......................................................B60j 5/10
[58] Field of Search.....................296/50, 51, 53, 56, 57, 59; 49/389, 463, 465; 16/171; 287/126

[56] References Cited

UNITED STATES PATENTS

| | | | |
|---|---|---|---|
| 2,556,130 | 6/1951 | Whittington | 296/57 X |
| 2,315,927 | 4/1943 | Brack | 16/171 X |
| 750,376 | 1/1904 | Lampitt | 296/56 X |
| 620,551 | 2/1889 | Porter | 16/171 UX |
| 1,265,191 | 5/1918 | Giles et al. | 49/389 X |
| 2,556,101 | 6/1951 | Negin et al. | 296/57 X |
| 3,092,406 | 6/1963 | Wasserstrom | 287/126 X |

Primary Examiner—Benjamin Hersh
Assistant Examiner—Leslie J. Paperner
Attorney—Fred C. Matheny

[57] ABSTRACT

This is a replacement hinge for a truck body tailgate which is normally movable between an upright closed position and an approximately horizontal open position but can be released for further downward movement, said hinge comprising a socket part having a longitudinal slot in it and another part having a flat hinge stud, one of said parts being secured to an end of the tailgate and the other part to a side wall of the truck body, the hinge stud and the slot in the socket being dimensioned and positioned so the stud can pass sidewise through the slot when the tailgate is lowered below its normal horizontal position thus providing for quick and easy removal of and replacement of the tailgate.

3 Claims, 6 Drawing Figures

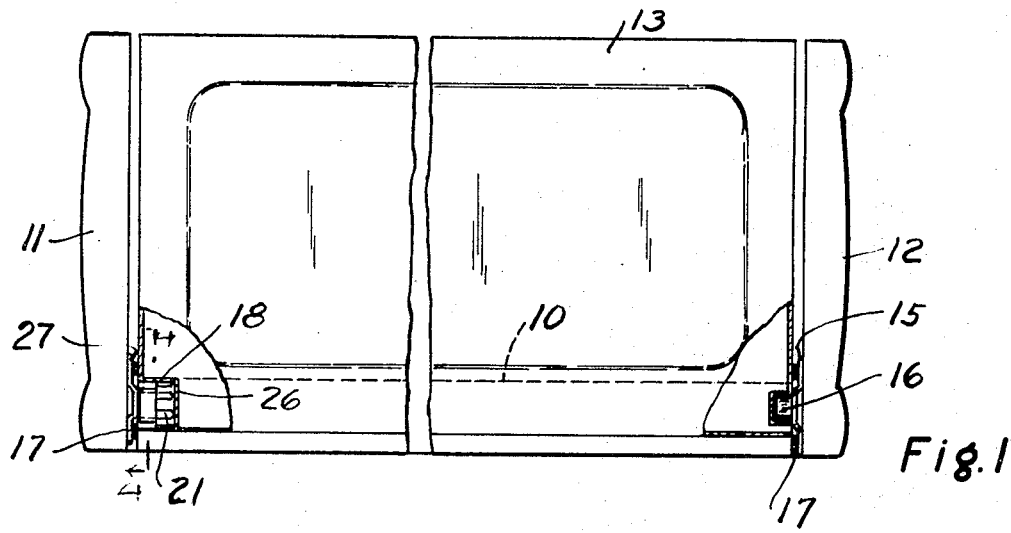
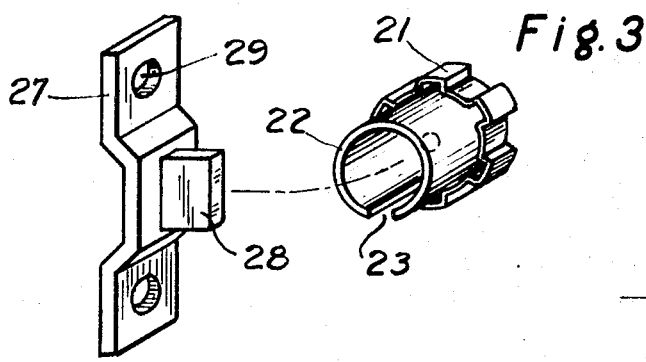
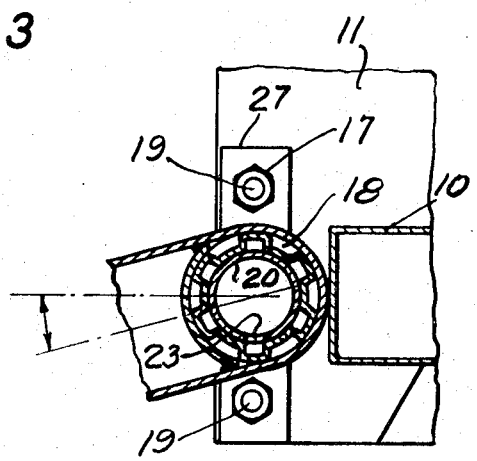
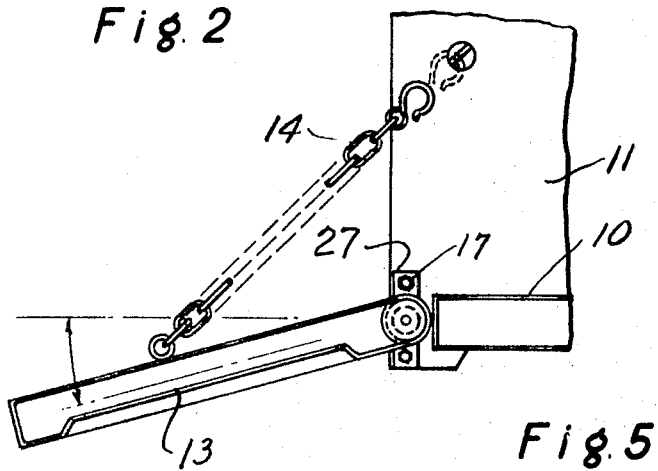
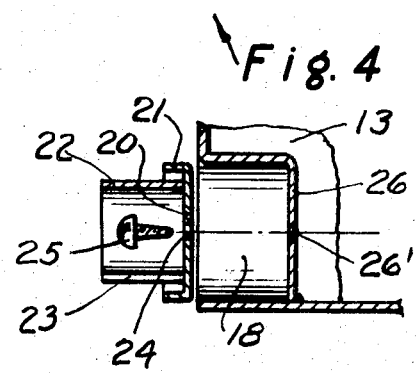
PATENTED APR 18 1972    3,656,801
Fig. 1
Fig. 2
Fig. 3
Fig. 4
Fig. 5
Fig. 6
INVENTOR.
Oliver Doutt
BY Thomas D. Doutt
Fred C. Matheny
ATTORNEY

QUICKLY DETACHABLE HINGE FOR TRUCK BODY TAILGATE

BACKGROUND OF THE INVENTION

Many trucks now in common use have tailgates hinged in such a way that at least a hinge part at one end of the tailgate must be unbolted from the truck body in removing the tailgate and must be bolted back on the truck body in applying or replacing the tailgate. The nuts on the bolts which hold this hinge part are difficult to get at with a wrench and the removal and replacement of the tailgate is troublesome and time consuming. Many truck owners have camper bodies which they wish to install on and remove from the truck at frequent intervals and usually the tailgate must be removed each time the camper body is installed and replaced each time the camper body is taken off. Also other uses of a truck may require the removal and replacement of a tailgate.

SUMMARY OF THE INVENTION

A primary object of our invention is to provide a hinge of strong, simple, reliable and inexpensive construction which makes possible quick and easy removal and replacement of any tailgate on which it is used and one which can be quickly and easily installed as a replacement of the tailgate hinges on many trucks now in common use.

Another object is to provide a metal tailgate hinge composed of a hinge socket part formed of a a longitudinally slotted bearibg tube or socket rigidly secured coaxially within a shallow cup shaped base and a hinged stud part composed of an elongated mounting plate carrying a rigidly attached, perpendicular, flat bearing stud of a thickness slightly less than the width of the slot in the bearing tube and a width suitable for a rotative fit of the stud in the bearing tube, whereby the two hinge parts can be assembled and disassembled by passing the stud sidewise through the slot in the bearing tube.

Other objects of our invention will be apparent from the following description and accompanying drawings.

BRIEF DESCRIPTION OF THE DRAWINGS

FIG. 1 is a fragmentary view in elevation showing a tailgate and parts of the rear end of a truck body having our replacement hinge applied thereto FIG. 2 is a detached perspective view of one part of our hinge comprising a mounting plate carrying a rigidly attached, flat hinge stud.

FIG. 3 is a perspective view of another part of our hinge comprising a longitudinally slotted bearing tube having a cup shaped base member.

FIG. 4 is a fragmentary view, partly in section and partly in elevation, taken substantially on broken line 4—4 of FIG. 1 and on a larger scale than FIG. 1, showing a tailgate in a downwardly inclined position into which it might be moved in detaching it from a truck bed.

FIG. 5 is a somewhat diagrammatic elevational view showing one conventional means which can be used for limiting downward movement of the tailgate to a substantially horizontal position, the means which limits movement of the tailgate being shown detached and the tailgate inclined downwardly below the position it will normally occupy when open.

FIG. 6 is a fragmentary, exploded sectional view showing parts of our hinge and a fragment of a tailgate.

DESCRIPTION OF THE PREFERRED EMBODIMENT

FIGS. 1, 4, 5 and 6 show fragments of a truck body comprising a bottom 10, two parallel side walls 11 and 12 and a tailgate 13 all of conventional sheet metal construction. The tailgate 13 is usually rounded and of substantial thickness at its bottom edge and is usually pivotally supported by duplicate hinges at or near its respective lowermost corners for pivotal movement between an upright closed position and a substantially horizontal open position in which it is parallel with and flush with and extends rearwardly from the floor or bottom 10.

Usually conventional devices, shown as chains 14 in FIG. 4, but which may be links, are provided to limit downward opening movement of the tailgate 13 and to support it in its lowermost or fully open position and usually these devices can be readily unfastened or detached to allow the tailgate 13 to be swingingly lowered below a horizontal position.

A conventional tailgate hinge is shown at the right in FIG. 1. This hinge comprises a mounting plate 15 having a rigidly attached cylindrical, inwardly protruding bearing stud 16. Two bolts having nuts 17 thereon are provided near the respective upper and lower ends of the mounting plate 15 to secure it to a side wall, such as wall 12 of the truck body. Each end of the tailgate 13 is shaped and dimensioned so as to form therein a bearing receptacle 18 of cylindrical shape and of proper diameter to fit rotatively over the adjacent cylindrical bearing stud 16.

Obviously when a hinge of the form shown at the right in FIG. 1 is used at each end of a tailgate 13 the mounting plate 15 at one end thereof will have to be unbolted and removed each time the tailgate is taken off. The plate 15 will usually be bolted back in its place after a tailgate is removed to make sure it will not become lost and this means that it will have to be unbolted, removed and again bolted back in place when the tailgate is put back on. This takes time and is troublesome because the nuts 17 which hold the mounting plate are difficult to get at.

In accordance with our invention we provide a socket type bearing part, shown detached in FIG. 3, whith can be easily installed permanently in the the bearing socket 16 at one end of the tailgate 13 and provide a stud type hinge part, shown detached in FIG. 2, which can be used as a replacement for a conventional mounting plate15 that carries a cylindrical stud 16.

Thr socket type bearing member shown in FIG. 3 comprises a cup shaped base part formed of a bottom wall 20 and a corrugated annular side wall 21 and a cylindrical bearing tube 22 of smaller diameter than the base 20 ,21 having a longitudinal slot 23 which is open at the outer end of said bearing tube 22. The bearing tube 22 is coaxial with the base 20,21 and has one end resting against the bottom 20 and is welded to the inwardly extending convolutions of the corrugated side wall 21 of said cup shaped base. Preferably the bearing tube 24 is formed from a flat piece of metal bent cylindrically so its two edges are left spaced apart and form the slot 23 which extends from end to end thereof. However it may be formed of a piece of pipe slotted from the outer end throughout part of its length.

The outwardly extending convolutions of the cup shaped base part taper convergently a slight amount from their outer toward their inner ends and the cup shaped base is dimensioned so it fits tightly and must be driven or pressed into the receptacle 18 in the end of the tailgate and is permanently installed in the tailgate in this way. The resiliency of the corrugated side wall 21 helps in making possible a tight and permanent fit of the base part 21 in the receptacle 18. However, a further safeguard against detachment of thr socket tybe hinge part is provided and comprises a perforation 24 in the bottom 20 of the base member which is adapted to receive a sheet metal screw 25 that is threaded into a hole 26' in a part 26 which forms the bottom wall of the socket 18 in the tailgate..

The stud type hinge part, FIG. 3, comprises an elongated mounting plate 27 having a flat bearing stud 28 rigidly attached to it approximately mid way between its two ends. Two bolt holes 29 are provided in plate 27 near its respective ends in suitable positions to fit over the bolts 19 in a side wall 11 which bolts previously secured a conventional mounting plate to the wall 11. Preferably the medial part of the mounting plate 27, which carries the stud 28, is offset a slight distance away from wall 11 to provide additional clearance between the adjacent end of a tailgate and the uppermost nut 17 which holds the mounting plate 27.

A tailgate having one end connected with a truck body by our readily releasable hinge operates in a conventional manner when moved between an upright and a horizontal position but is quickly and easily detachable when it is lowered far enough below a horizontal position so the slot 23 in bearing tube 22 is aligned with an edge of the flat hinge stud 28 and is easily replaced by positioning it at the same downward incline and engaging the bearing tube 22 with the hinge stud 28.

We claim:

1. The combination with the tailgate of a truck body which has side walls and a floor and in which the lower edge portion of the tailgate is pivoted adjacent the rear end of the truck body for swinging movement between an upright closed position and an approximately horizontal open position in which it is flush with the truck body floor and extends rearwardly therefrom and in which readily releasable means normally limits downward swinging movement of the tailgate to the substantially horizontal position; of a cylindrical receptacle in each end of the tailgate near the lower edge thereof; and a two part hinge pivotally connecting each end of said tailgate with a side wall of the truck body each hinge comprising a cylindrical bearing tube having in its wall a longitudinal slot extending from its outer end toward its inner end; and a base member of larger over all diameter than the bearing tube rigid with the inner end portion of each bearing tube and serving as a base for the bearing tube, each base member being dimensioned so it fits tightly within and is retained within the cylindrical receptacle in an end of the tailgate; and a hinge stud part comprising a mounting plate secured to the side wall of the truck body, and a flat hinge stud rigid with and extending perpendicularly from said mounting plate, said flat hinge stud being dimensioned so it can be passed transversely through said slot into and out of said bearing tube when it is in edgewise registration with said slot and is rotatively confined within said bearing tube when it is offset from a position of edgewise registration with said slot, said stud and the slot in said bearing tube being relatively positioned so the bearing stud is in edgewise registration with the slot when the tailgate is inclined downwardly at a substantial angle below its normal substantially horizontal position.

2. The tailgate and hinge as claimed in claim 1, in which the base member is cup shaped and its side walls are longitudinally corrugated and in which the outwardly extending parts of the corrugations in said base member fit tightly within the cylindrical receptacle in the end of the tailgate and the inwardly extending parts of said corrugations are welded to said bearing tube.

3. The tailgate and hinge as claimed in claim 2, in which the receptacle in the tailgate has a bottom wall and in which a perforation is provided in the bottom of said cup shaped base member and in which a screw extends through said perforation in the bottom of said cup shaped base member and is threaded into the bottom wall of the receptacle in the tailgate.

* * * * *